United States Patent
Hauler et al.

[11] Patent Number: 6,022,081
[45] Date of Patent: Feb. 8, 2000

[54] ORNAMENTAL WHEEL COVER RETENTION SYSTEM

[75] Inventors: Gregory R. Hauler, Rockford; Jeff Bruce, Wayland, both of Mich.

[73] Assignee: Lacks Industries, Inc., Grand Rapids, Mich.

[21] Appl. No.: 08/988,477

[22] Filed: Dec. 1, 1997

[51] Int. Cl.[7] ........................................................ B60B 7/00
[52] U.S. Cl. ................... 301/37.1; 301/37.37; 301/37.42
[58] Field of Search .............................. 301/37.37, 108.4, 301/37.1, 37.42, 108.1, 108.3

[56] References Cited

U.S. PATENT DOCUMENTS

| | | |
|---|---|---|
| 1,320,551 | 11/1919 | Holley . |
| 2,031,092 | 2/1936 | Begg . |
| 2,166,216 | 7/1939 | Lyon . |
| 2,650,134 | 8/1953 | Lyon . |
| 2,670,244 | 2/1954 | Lyon . |
| 2,722,822 | 11/1955 | Thomas . |
| 2,819,929 | 1/1958 | Hunt . |
| 2,973,226 | 2/1961 | Ellies . |
| 3,111,347 | 11/1963 | Miller et al. . |
| 3,135,558 | 6/1964 | Johnston, Jr. et al. . |
| 4,012,078 | 3/1977 | Meyers . |
| 4,123,111 | 10/1978 | Renz et al. . |
| 4,133,583 | 1/1979 | Spisak . |
| 4,217,003 | 8/1980 | Main . |
| 4,316,638 | 2/1982 | Spisak . |
| 4,382,635 | 5/1983 | Brown et al. . |
| 4,458,952 | 7/1984 | Foster et al. . |
| 4,626,037 | 12/1986 | Kushner . |
| 4,707,035 | 11/1987 | Kondo et al. .......................... 301/37.37 |
| 4,998,780 | 3/1991 | Eshler et al. .......................... 301/37.37 |
| 5,071,197 | 12/1991 | Webster et al. ....................... 301/37.37 |
| 5,163,739 | 11/1992 | Stanlake ................................ 301/37.37 |
| 5,249,845 | 10/1993 | Dubost .................................. 301/37.37 |
| 5,297,854 | 3/1994 | Nielsen et al. . |
| 5,520,445 | 5/1996 | Toth ...................................... 301/37.37 |
| 5,595,422 | 1/1997 | Ladouceur ............................ 301/37.37 |
| 5,667,281 | 9/1997 | Ladouceur ............................ 301/37.37 |
| 5,842,749 | 12/1998 | DiMarco ............................... 301/37.37 |

*Primary Examiner*—D. Glenn Dayoan
*Assistant Examiner*—Long Bao Nguyen
*Attorney, Agent, or Firm*—Vanophem Meehan & Vanophem P.C.

[57] ABSTRACT

An ornamental wheel cover integrally retained on the lug nuts of a vehicle wheel that provides positive positioning of the cover to the lug nuts. The lug nuts preferably have a flange that defines an upper shoulder. The cover is provided with a number of elongated tubular extensions axially projecting from the cover that are each partially slotted to provide a plurality of cantilevered fingers. Each finger has an undercut groove that has a shoulder which positively positions the cover to the upper shoulder of the lug nuts of the wheel. Below the undercut groove is a bulbous portion that contacts the lug nut below the flange. When the cover is attached to the wheel, the elongated tubular extensions are aligned with the lug nuts and the cover is moved axially inwardly of the wheel so that the cantilevered fingers separate slightly as the bulbous portions pass over the flange of the lug nut. The shoulder of the undercut groove engages the upper shoulder of the lug nut flange, thereby providing a positive axial location of the cover to the wheel and eliminating the effects of misalignment of components due to tolerance stack ups. The bulbous portion passes over the flange of the lug nut and engages the underside of the flange, thereby retaining the cover on the lug nut.

15 Claims, 2 Drawing Sheets

ORNAMENTAL WHEEL COVER RETENTION SYSTEM

BACKGROUND OF THE INVENTION

1. Field of the Invention

This invention relates to plastic vehicle wheel covers with integral retention systems and more particularly to ornamental wheel covers that are retained on the lug nuts of the vehicle wheel.

2. Description of the Prior Art

Retention systems for ornamental wheel covers of the prior art require the use of multiple components in order to assemble the cover to the wheel. For example, in Spisak, U.S. Pat. No. 4,316,638, the wheel assembly includes metal retainers for bitingly engaging the sides of wheel attaching nuts to maintain the wheel in trim in position on the wheel wherein metallic retainer members have one end attached to the inside of a plastic hub cap, a mid-portion extending through an opening in the cap and an opposite end engaging the lug nut of the wheel to limit radial and axial movement relative to the ornamental cap in its mounted condition. Foster et al., U.S. Pat. No. 4,458,952, uses a round spring steel ring mounted on the inboard face of the wheel trim cover to engage in grooves in the wheel mounting lug nuts or the studs on which they are threaded to releasably retain the trim member on the wheel. The ring is mounted on the trim member such that the retention forces generated by the flexed ring are absorbed entirely by the studs and not by the trim member. Therefore, distortion and warpage of the trim member is avoided. In U.S. Pat. No. 5,297,854 to Gerald Nielsen et al. and the inventor of the present invention, Gregory Hauler, the wheel cover is secured to the wheel by the use of a plurality of metal retainers which are attached to the plastic cover. The metal retainers include a plurality of protrusions which act to engage the lug nuts and thereby attach the cover to the wheel.

Because of the high costs associated with multiple piece assemblies some prior art retention systems have attempted to provide a single piece design for a retention system to avoid the problems and costs associated with multiple piece designs. For example, U.S. Pat. No. 4,123,111 to Renz et al. discloses a retaining cover that is provided circumferentially in the engaging plane of the lug nuts with detents to engage the outer periphery of the lug nuts. The retaining cover has a shape that differs from the circular shape of the wheel cover exhibiting a relatively large lever arm between the connecting lines of the points of engagement of the lug nuts, thereby reducing the spring rate. The lug nuts are seated in recesses in the peripheral edge of the retaining cover. The edge of the retaining cover snaps in within the area of the recesses. To cover the lug nuts a wheel cover cap is provided that is mounted over the retaining cover.

Several problems exist with the Renz et al. device. Plastic is a relatively low strength material which tends to relax and/or creep over time and with temperature. Therefore, removal and replacement of the retaining cover could lead to loss of retention of the retaining cover to the lug nuts. The retaining cover is subject to stress and flexing in an area that is recessed and has a much thinner material thickness than the surrounding area of the cover, thereby making it subject to cracking. Expansion rates between the steel lug nut and plastic cover differ aggravating the above stated problems. Further, the fact that Renz et al. require a relatively large lever arm between the connecting points of engagement and the detent points in order to reduce the spring rate, it would not be possible to obtain this arrangement with shallow profile wheel covers. Further, the two-piece assembly provides large cavities between the retaining cover and the outer wheel cover in which mud and road debris can collect over time.

U.S. Pat. No. 4,382,635 to Brown attempts to overcome some of these problems by disclosing a wheel cover with integral retention fingers which is useable on conventional steel wheels. The cover is integrally retained on the wheel by the cooperating inter-engagement of tubular extensions of the cover mounting to the lug nuts. The extensions are axially slotted so as to be divided into a plurality of cantilevered fingers which cooperate with the lug nuts to retain the wheel cover thereto. The fingers of each extension include integral radially extending abutments which resiliently engage within a radial opening groove of a respective lug nut to resiliently grip the nut and retain the cover thereto. Concurrent with receipt of the abutments in the groove, a tapered radial face on each finger engages an axially outwardly extending annular face of the apertured embossment in an attempt to provide a slight axial outward force on each finger to prevent axial shifting movement of the extensions relative to the lug nuts.

The abutments describe a circle which is slightly less than the circle of the hexagonal portion of the lug nuts so that the fingers slightly separate or flex axially outwardly as the abutments move over the hexagonal portion of the lug nuts. Therefore, the fingers separate as the abutments move over an annular rib of the lug nuts until the abutments snap into the circumferential groove in each respective lug nut. When the abutments are received in the groove, the fingers return substantially to their normal molded shape. A radial tapered face of each abutment engages an axially outwardly extending annular face of the wheel surface to provide a slight axial outward force on each extension to prevent axial shifting movement of the extensions relative to the lug nuts.

One of several problems associated with this design is the adverse effects of tolerance stack ups between the axially outwardly extending annular face and the location of the groove on the lug nut. The fit of the cover to the lug nut depends on the depth and width of a groove that is on the lug nut and a tapered surface on the wheel face next to where the lug nut is seated. The tolerance build up among the radial tapered extension on the end of each finger of the cover, the lug nut, and the taper on the wheel's surface results in groove width variations that will prevent the radial tapered face of the abutment to move to the bottom of the groove, resulting in a loose fit on the lug nut and a stress condition in the fingers of the retainer, thereby subjecting the retainer to the problems listed above regarding the use of plastic.

Another problem associated with the lack of positive positioning in the Brown design is the potential for improper installation. It is possible, during attachment of the cover to the wheel, to apply a force that causes the cover to overtravel and press the fingers against the tapered wheel surface which in turn opens up the fingers, forcing them out of the groove and causing them to travel along the tapered wheel surface, which results in a loose fit.

Yet another drawback of the Brown design is a potential problem with the location of the circumferential groove on the lug nut and improper torque on aluminum wheels. It is known in the art that in order to achieve proper torque on the lug nuts for aluminum wheels, the conical seat must be deeper, providing more surface area contact with the wheel surface than required for steel wheels. The groove in the lug nut of the Brown design will prevent the lug nut from seating properly on an aluminum wheel by presenting less surface area contact with the aluminum wheel and thereby making it a problem to achieve sufficient torque for an aluminum wheel. In other words, the lug nut in the Brown design is not compatible with both steel and aluminum wheels.

A further problem is that the molding technique used to make the wheel cover of the Brown device results in the need to cover the molded body with an outer skin or cover in order to seal the nut wells that are made by the molding process. Again, a multiple piece wheel cover results in excessive additional manufacturing costs.

Because of the various problems identified with prior art retention systems, there is a need for a one-piece cover having an integral fastening system that provides positive positioning of the cover relative to the wheel thereby eliminating the effects of tolerance stack ups and the possibility of overtravel that result in poor fit of the cover to the wheel. There is also a need for a one-piece, low cost cover that attaches to the lug nuts with a fit that is independent of manufacturing tolerances outside of the physical dimensions of the nut itself, thereby eliminating the excessive variances that result from tolerance stack ups of several interrelated parts, i.e. the cover, the lug nut, the wheel surface, and the interrelationship of all three items. The cover attachment must not affect the lug nut torque or the contact interface between the lug nut and the wheel surface area so that a standard lug nut can be used for both aluminum and steel wheels.

SUMMARY OF THE INVENTION

The present invention is an ornamental wheel cover integrally retained on the lug nuts of a vehicle wheel that provides positive positioning in an inboard/outboard axial direction of the cover to the lug nuts. The lug nuts typically have a flange that defines an upper shoulder. In the preferred embodiment of the present invention, the cover is provided with a number of elongated standoffs or tubular partially slotted extensions axially projecting from the back of the cover. The extensions are each partially slotted to provide a plurality of cantilevered tapered fingers.

Near the end of each cantilevered tapered finger is an undercut groove with a shoulder that defines one end of a groove and a tapered portion defining an opposite end of the groove. The cantilevered tapered finger, beyond the groove, terminates in a bulbous portion. When the cover is attached to the wheel, the elongated tubular extensions are aligned with the lug nuts and the cover is moved axially inwardly of the wheel so that the cantilevered fingers separate slightly as their bulbous end portions pass over the lug nut and associated flange until the undercut groove is allowed to snap over the flange of the lug nut. Concurrently, the shoulder of the undercut will abut against the upper shoulder of the lug nut flange, thereby providing a positive axial location of the cover to the wheel and eliminating the effects of tolerance stack ups of any other surfaces.

The bulbous portion passes over the flange of the lug nut and the tapered portion engages the underside of the flange, thereby creating a retention force sufficient to retain the cover on the lug nut. The end of the elongated tubular extension is spaced a predetermined distance from the wheel surface and does not contact the wheel surface, such predetermined distance being controlled by the overall length of the lateral standoffs, thereby eliminating the possibility of overtravel or interaction with the wheel surface, resulting in a fit that provides significantly improved retention over prior art cover retention systems.

It is an object of the present invention to provide a cover that can be used interchangeably on steel and aluminum wheels.

It is another object of the present invention to provide an ornamental wheel cover with an integral retention system that is retained by the cooperation of tubular extensions of the cover with the lug nuts that attach the wheel to the vehicle without interaction with the wheel surface.

It is yet another object of the present invention to provide lateral standoffs to positively axially position the cover to the wheel, eliminating the effects of tolerance stack ups.

It is a further object of the present invention to maintain space between the end of the tubular extensions and the wheel, thereby eliminating poor fit as a consequence of overtravel and interference with the wheel surface when attaching the cover to the wheel.

Further objects, features and advantages of the invention will become more apparent from a review of the brief description of the figures taken in conjunction with a detailed description of the preferred embodiment that follows.

DETAILED DESCRIPTION OF THE PREFERRED EMBODIMENT

Figure 1:
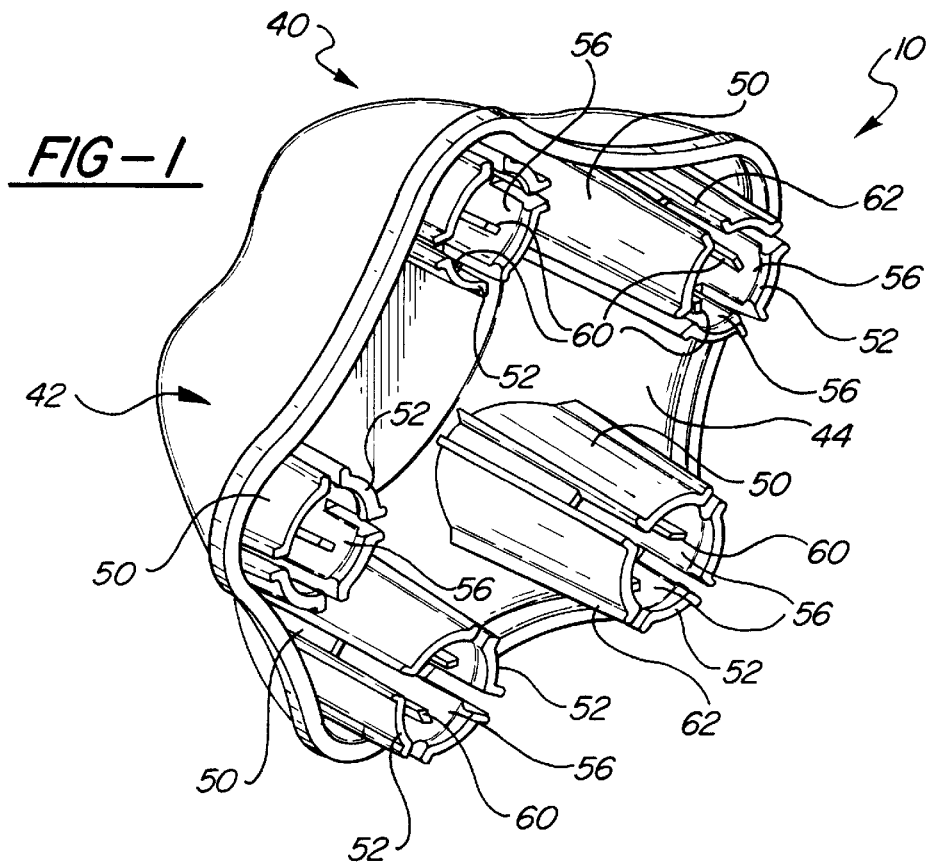
FIG. 1 is a perspective view of the rear of the cover.
Figure 2:
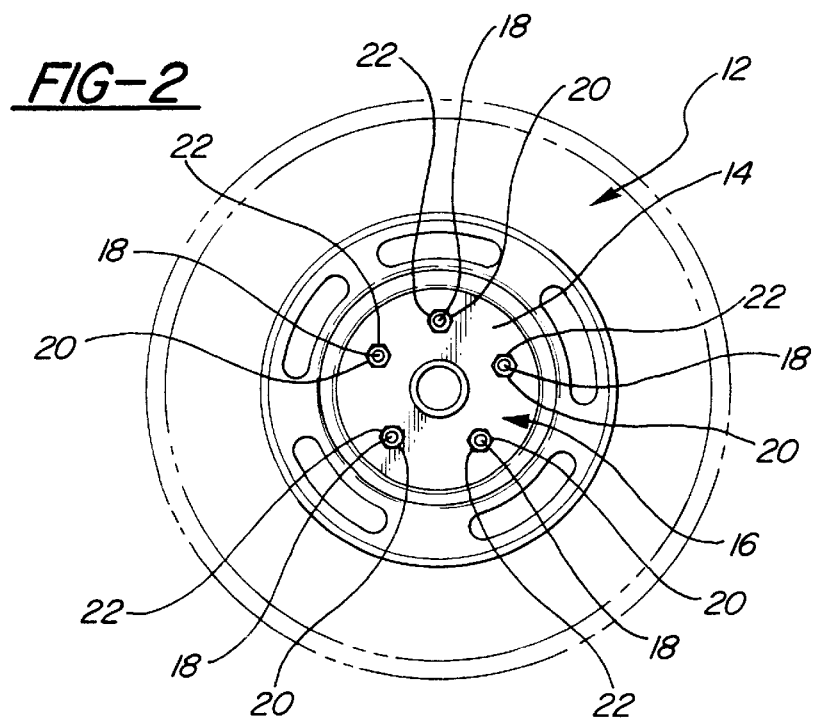
FIG. 2 is a plan view of a wheel to which a cover of the present invention (not shown) is to be attached.

The ornamental wheel cover retention system 10 of the present invention (shown in FIGS. 1 and 3–5) is to be used on a wheel 12 shown in FIG. 2 that includes a hub 14 having a typical hole pattern 16 that receive studs 18 that extend laterally from the vehicle axle along the wheel's axis of rotation (not shown). The wheel 12 is mounted on the studs 18, and lug nuts 20 are secured on the studs to retain the wheel on the vehicle.

Figure 3:
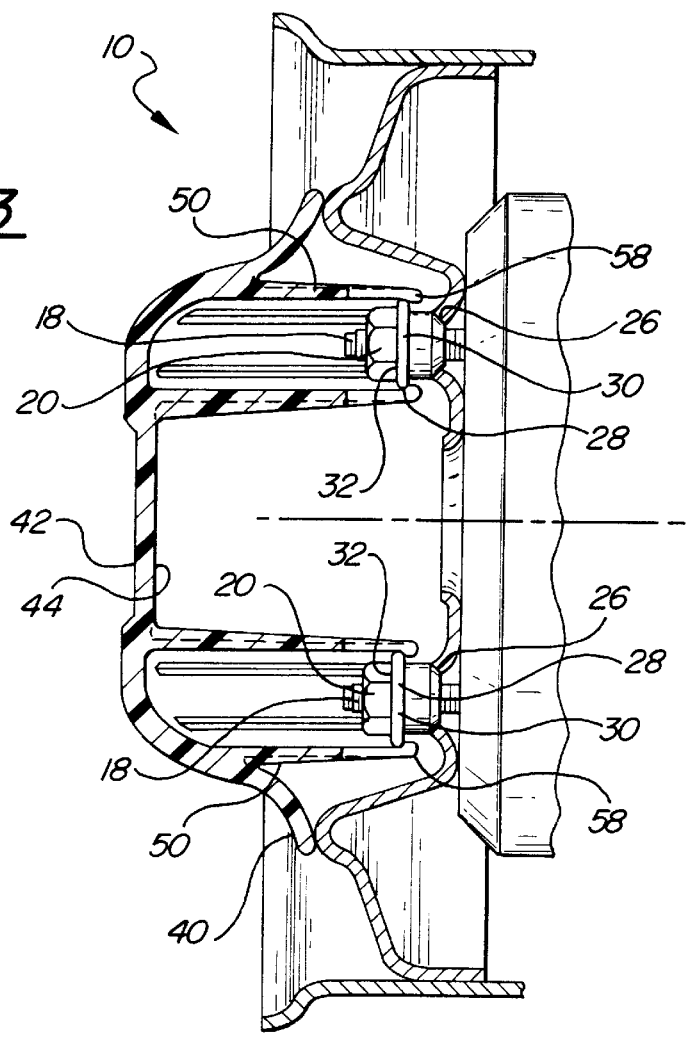
FIG. 3 is a sectional view of FIG. 2 including a cover 40 according to the present invention.
Figure 4:
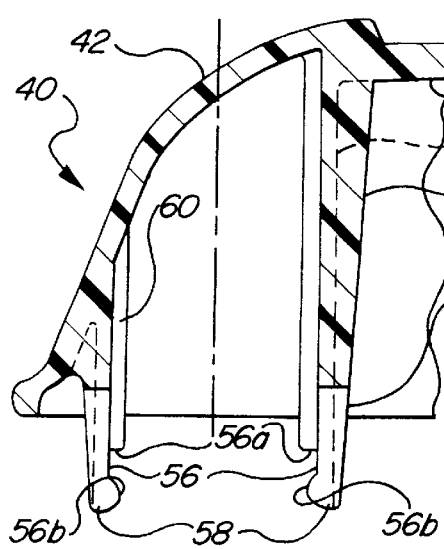
FIG. 4 is a sectional view of an elongated tubular extension of the present invention prior to attachment to a lug nut.
Figure 5:
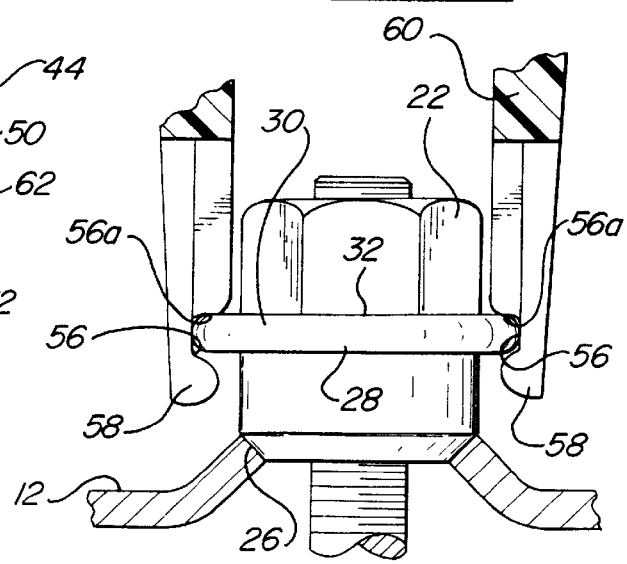
FIG. 5 is an enlarged sectional view of an elongated tubular extension of the present invention shown attached to a lug nut.

The lug nuts 20 include a hex head 22, best shown in FIGS. 3 and 5, and further include an outer annular surface 28 extending between the hex head 22 and a wheel engaging surface 26. The outer annular surface 28 defines a flange 30 having an upper shoulder 32. The lug nuts 20 of this design are equally adaptable to steel wheels and aluminum wheels. The conical seat on an aluminum wheel is deeper because more surface area contact between the wheel 12 and the lug nut 20 is required to achieve proper torque requirements. The lug nut design of the present invention will not affect the amount of surface area contact with the wheel, whether steel or aluminum, thereby allowing for adequate torque in either application. This feature is extremely efficient and cost effective for assembly purposes by allowing a standard lug nut to be used on one or more vehicles for all of the wheel designs applicable to a vehicle, whether steel or aluminum.

A wheel cover 40 of the present invention is a plastic part that can be injection molded. The wheel cover 40, best shown in FIGS. 1, 3 and 4, has a front face 42 that provides an aesthetic view of the wheel cover, and a rear face 44. A plurality of elongated tubular extensions 50 axially protrude from the rear face 44 of the cover 40. Each of the elongated tubular extensions 50 are partially slotted to provide a plurality of cantilevered fingers 52.

In the preferred embodiment, each finger 52 is provided with an undercut groove 56 that is defined by an end of an internal rib 60 and a bulbous portion 58 of each finger 52. The internal rib 60 has a shoulder 56a at one end and the bulbous portion 58 has a tapered or contoured sidewall 56b at another end. The shoulder 56a is used to positively position the cover 40 to the lug nuts 20 on the wheel 12 as will be hereinafter discussed. As best shown in FIG. 5, the shoulder 56a of the undercut groove 56 engages the upper shoulder 32 on the annular flange 30 of the lug nut 20 providing a positive axial position of the cover 40 to the wheel 12. The shoulder 56a of the undercut groove 56 prevents overtravel of the cover during assembly of the cover 40 to the wheel 12 by acting as a positive axial stop against the upper shoulder 32 of the annular flange 30 of the lug nut 20. Adjacent the shoulder 56a is the undercut groove 56 that circumscribes the lug nut flange 30 that is defined by the tapered or contoured sidewall 56b of the bulbous portion 58 on the end of the cantilevered finger 52. The tapered or contoured sidewall 56b of the undercut groove 56 contacts the lug nut 20 below the flange 30 to provide a retention force in order to keep the cover 40 mounted to the wheel 12.

The internal ribs 60 are provided along the center of each of the fingers of the plurality of cantilevered fingers 52, along the surface inside the tubular extension 50. The internal ribs 60 add strength and durability to the cantilevered fingers 52, preventing them from becoming weak due to removal and replacement of the cover. Additionally, ribs 62 are provided on each cantilevered finger 52 on the surface outside of the tubular extension 52. Preferably, the ribs are provided on the outer edges of the fingers 52, as best shown in FIG. 1.

When the cover 40 is attached to the wheel 12, as shown in FIG. 3 and in greater detail in FIG. 5, the elongated tubular extensions 50 are aligned with the lug nuts 20 and the cover 40 is moved axially inwardly of the wheel 12 so that the cantilevered fingers 52 separate slightly as the bulbous portion 58 passes over the lug nut flange 30. The undercut groove 56 snaps over the flange 30 thereby engaging the shoulder 56a with the upper shoulder or surface 32 of the lug nut flange 30, resulting in a positive location of the cover 40 to the wheel 12 and eliminating the effects of tolerance stack ups as a result of interaction with any other surfaces.

The fit of the cover 40 to the wheel 12 is not dependent upon the dimensions and location of the groove in the lug nut as in prior art retention systems such as the one described in Brown above. Because the conical seat in an aluminum wheel is deeper than a steel wheel, the grooved lug nut of the Brown design will prevent the lug nut from seating properly, resulting in less surface area contact between the aluminum wheel and the lug nut. The amount of surface area contact, whether with an aluminum or a steel wheel, between the lug nut 20 of the present invention and the wheel 12 is unaffected by the design of the lug nut 20. There is no groove beneath the annular surface that would prevent surface area contact with the wheel thereby allowing the cover of the present invention to be used with a steel wheel as well as an aluminum wheel. The cover retention system disclosed in the Brown patent which requires a grooved lug nut cannot be used on an aluminum wheel without adversely affecting the torque because the groove results in less surface area contact with an aluminum wheel where more is required.

In the present invention, the bulbous portion 58 passes over the flange 30 of the lug nut 20 and the tapered or contoured sidewall 56b of the undercut groove 56 engages the lower periphery of the flange 30, thereby retaining the cover 40 on the lug nut 20. The end of the elongated tubular extension 50 is spaced a predetermined distance from the wheel surface 12, such predetermined distance being controlled by the positive location of the shoulders 32, with respect to the shoulder 56a, thereby eliminating the potential for overtravel of the fingers, resulting in a positive axial fit that is improved over prior art cover retention systems. A space exists between the end of the elongated tubular extensions 50 and the wheel 12 itself to ensure that the cover 40 cannot be forced into the wheel 12. As discussed above, if the cover 40 is allowed to overtravel, forces applied to the elongated tubular extensions 50 would press the cantilevered fingers 52 against the wheel 12 and force them apart, resulting in a loose fit of the cover 40 to the wheel 12. The undercut groove 56 of the ornamental wheel cover retention system 10 of the present invention eliminates this potential problem.

The integral retention system of the present invention provides a positive location of the cover relative to the lug nuts and the wheel through lateral standoffs defining an undercut groove with a shoulder that acts as a stop against the lug nut flange. The bulbous portion 58 of the cantilevered fingers engage the lug nut flange thereby retaining the cover on the wheel. Because of the positive positioning, the cover does not contact the wheel and cannot overtravel. The fit is more consistent over prior art retention systems that contact the surface of the wheel.

A standard lug nut can be used equally as well in both steel and aluminum wheel applications. The undercut groove 56 arrangement eliminates the need for a groove on the lug nut. The interface between the shoulder 56a of the undercut groove 56 and the lug nut flange 32 eliminates the defined problems of prior art retention systems caused by tolerance stack ups.

It is to be understood that the detailed description and drawings of the present invention do not describe the only embodiment of the present invention, and in fact various modifications are obtainable without departing from the scope of the present invention. Accordingly, the scope of the invention is to be limited only by the claims appended hereto.

What is claimed is:

1. A wheel cover comprising:

a wheel cover base having a front surface and an oppositely disposed rear surface;

a plurality of elongated tubular extensions having an outboard surface, an end basal portion attached to said wheel cover base and an opposite end extending in a direction away from said rear surface, said plurality of elongated tubular extensions being circumferentially spaced about said rear surface, said end basal portion of each said tubular extension being a solid tubular body, said opposite end of each of said plurality of tubular extensions being hollow and axially slotted to define a plurality of cantilevered fingers to an apical end;

each tubular extension of said plurality of tubular extensions having a radially inboard peripheral surface having at least one rib extending therefrom;

each finger of said plurality of cantilevered fingers defining (having) an undercut groove between said apical end and said at least one rib extending from said radially inboard peripheral surface, said at least one rib having at least one shoulder communicating with a lug nut to define a positive stop such that as said wheel cover is mounted to a wheel said at least one shoulder provides a positive axial stop for said wheel cover; and each finger of said plurality of cantilevered fingers further having a bulbous end portion at said apical end, said bulbous end portion having a contoured surface along a wall of said undercut groove, said contoured surface of said undercut groove communicating with said lug nut to restrain said wheel cover from removal from said lug nut after said wheel cover is installed on said wheel.

2. A wheel cover as claimed in claim 1 wherein the thickness of each finger of said plurality of cantilevered fingers decreases from said basal portion towards said apical end.

3. A wheel cover as claimed in claim 1 wherein said contoured surface of said undercut groove is arcuate.

4. A wheel cover as claimed in claim 1 wherein said contoured surface of said undercut groove is tapered.

5. A wheel cover as claimed in claim 1 wherein each finger of said plurality of cantilevered fingers has a rib extending along the length of said finger from said basal portion to said apical end along said radially inboard peripheral surface of each of said tubular extensions.

6. A wheel cover as claimed in claim 1 wherein each finger of said plurality of cantilevered fingers has at least one rib extending partially along said outboard surface of each of said tubular extensions.

7. In combination with a vehicle wheel of the type having a plurality of circumferentially spaced lug nuts, each lug nut having a flange with an upper shoulder portion and a plastic wheel cover of the type having an inboard surface, an outboard surface and a plurality of elongated tubular extensions circumferentially spaced and extending in a direction away from said inboard surface of said wheel cover, a portion of each of said plurality of elongated tubular extensions being hollow and axially slotted to define a plurality of cantilevered fingers to an apical end, wherein the improvement comprises:

each tubular extension of said plurality of tubular extensions having a radially inboard peripheral surface having at least one rib extending therefrom;

each said finger of said plurality of cantilevered fingers defining an undercut groove between said apical end and said at least one rib extending from said radially inboard peripheral surface, said at least one rib communicating with said upper shoulder portion of said flange of each of said lug nuts to define a positive stop such that as said wheel cover is mounted to said wheel said at least one upper shoulder portion provides a positive axial stop for said wheel cover; and each finger of said plurality of cantilevered fingers further having a bulbous end portion at said apical end, said bulbous end portion having a contoured surface along a wall of said undercut groove, said contoured surface of said undercut groove communicating with said lug nut to restrain said wheel cover from removal from said lug nuts after said wheel cover is installed on a wheel;

whereby as said cover is fitted over said plurality of circumferentially spaced lug nuts by aligning said elongated tubular extensions with a respective lug nut, said bulbous end of each of said fingers passes over said flange and said undercut groove snaps over said flange resulting in a positive axial location of said wheel cover with respect to said wheel.

8. A combination as claimed in claim 7 wherein the thickness of each finger of said plurality of cantilevered fingers decreases from said basal portion towards said apical end.

9. A combination as claimed in claim 7 wherein said contoured surface of said undercut groove is arcuate.

10. A combination as claimed in claim 7 wherein said contoured surface of said undercut groove is tapered.

11. A combination as claimed in claim 7 wherein each finger of said plurality of cantilevered fingers has a rib extending along the length of said finger from said basal portion to said apical end along said radially inboard peripheral surface of each of said tubular extensions.

12. A combination as claimed in claim 7 wherein each finger of said plurality of cantilevered fingers has at least one rib extending partially along said outboard surface of each of said tubular extensions.

13. A wheel cover adapted to be mounted to the lug nuts of an automotive wheel, said wheel cover comprising:

a wheel cover base having a front surface and an oppositively disposed rear surface;

a plurality of elongated tubular extensions having an end basal portion attached to said wheel cover base and an opposite end extending in a direction away from said rear surface, said plurality of elongated tubular extensions being circumferentially spaced about said rear surface, said end basal portion of each of said tubular extensions being a hollow tubular body, said opposite end of each of said plurality of tubular extensions having:

an inner surface;

an outer surface circumscribing said inner surface to define a wall therebetween; and a plurality of slots in said opposite end to define a plurality of cantilevered fingers having an apical end;

means for positively fixing the axial position of each of said plurality of elongated tubular extension on said lug nuts, said positive fixing means being located on said inner surface of each of said plurality of tubular extensions;

such that upon mounting of said wheel cover onto said lug nuts of said automotive wheel, said apical end of each finger of said plurality of cantilevered fingers is cantilevered radially outwards to snap onto and over said lug nut whereby said positive fixing means fixes the axial position of each of said plurality of tubular extensions to prevent overtravel of said plurality of cantilevered fingers during assembly of said wheel cover to said lug nuts.

14. The wheel cover as claimed in claim 13 wherein said means for positively fixing the axial position of each of said plurality of tubular extension further comprises:

an undercut groove located on said inner surface of each of said cantilevered fingers of said plurality of tubular extensions; and at least one rib extending radially inward from said inner surface of at least one of said plurality of tubular extensions;

whereby said at least one rib communicates with said lug nut to positively fix the axial position of said cover relative to said wheel.

15. The method of manufacturing a wheel cover adapted to be mounted to the lug nuts of a wheel, said method comprising the steps of:

providing a wheel cover base having at least one elongated tubular extension with one end attached to said wheel cover base and an opposite end extending in a direction away from said wheel cover base, said at least one elongated tubular extension being a hollow tubular body having said one end attached to said wheel cover base and said opposite end having a plurality of slots to define a plurality of cantilevered fingers having an apical end;

providing a circumferential groove on said at least one elongated tubular extension near said apical end of said plurality of cantilevered fingers; and placing at least one rib on said at least one elongated tubular extension between said apical end and said wheel cover base whereby as said wheel cover is mounted to said wheel said at least one rib provides a positive axial stop for said wheel cover.

* * * * *

UNITED STATES PATENT AND TRADEMARK OFFICE
CERTIFICATE OF CORRECTION

PATENT NO : 6,022,081
DATED : February 8, 2000
INVENTOR(S) : Hauler et al.

It is certified that error appears in the above-identified patent and that said Letters Patent are hereby corrected as shown below:

Column 1, line 32, after "Nielsen" delete ----et al.----.

Column 6, line 61, delete ----(having)----.

Column 8, line 31, delete "extension" and insert ----extensions----.

Column 8, line 46, after "of" and before "tubular" insert ----elongated----; same line, delete "extension" and insert ----extensions----.

Signed and Sealed this

Twenty-fourth Day of April, 2001

Attest:

NICHOLAS P. GODICI

Attesting Officer

Acting Director of the United States Patent and Trademark Office